Figure 1:
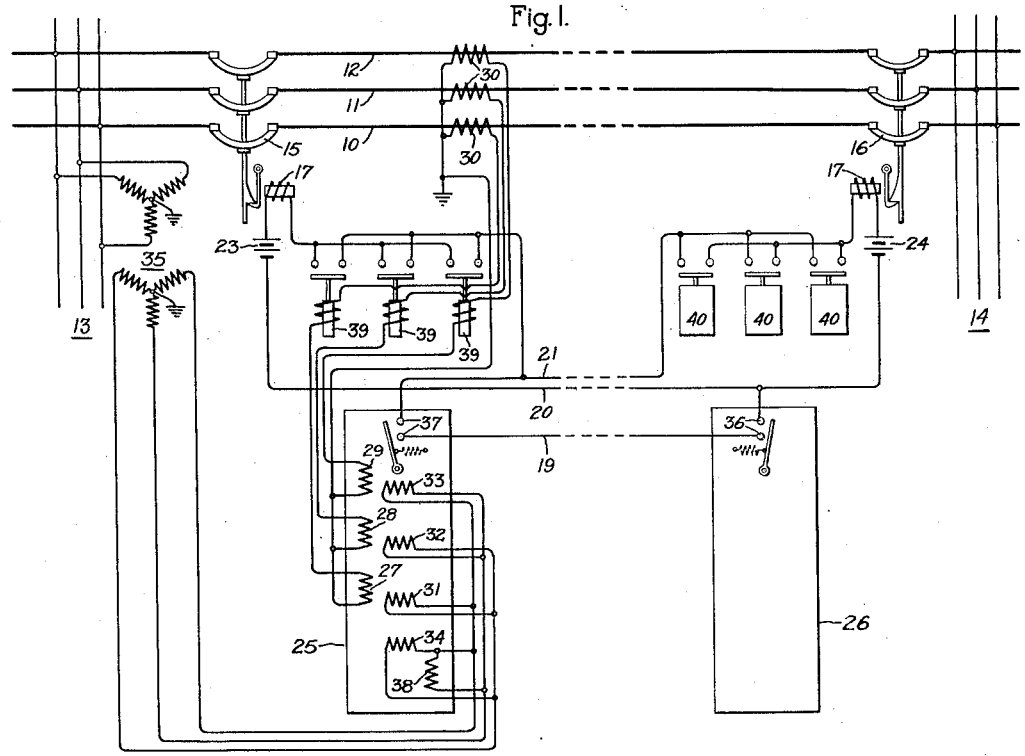

Oct. 10, 1933.  E. H. BANCKER  1,930,333
PROTECTIVE ARRANGEMENT
Filed July 8, 1932    4 Sheets-Sheet 1

Inventor:
Elbert H. Bancker,
by Charles E. Tullar
His Attorney.

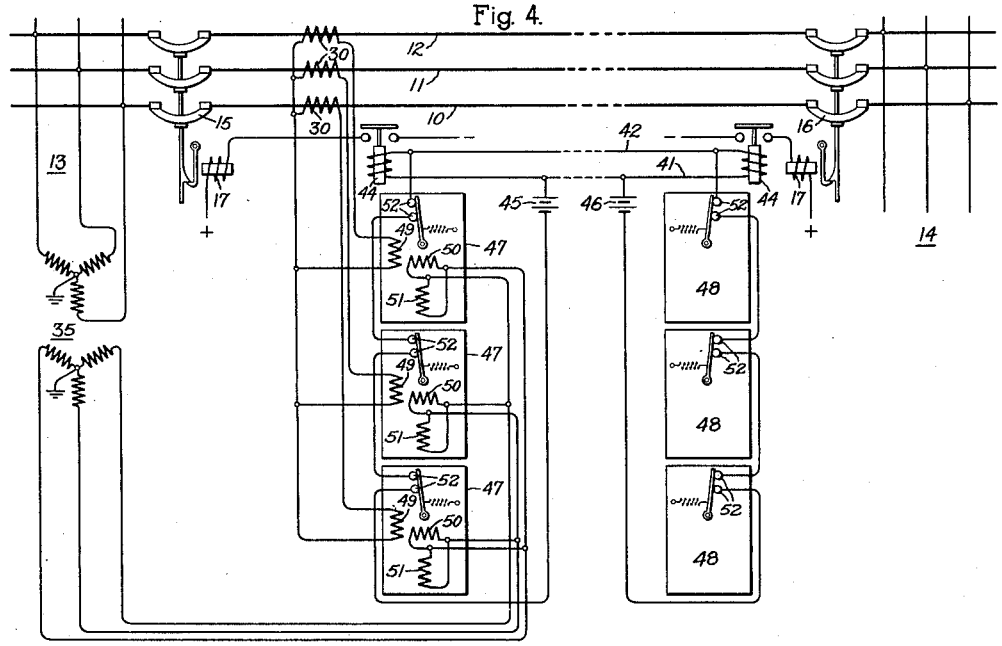
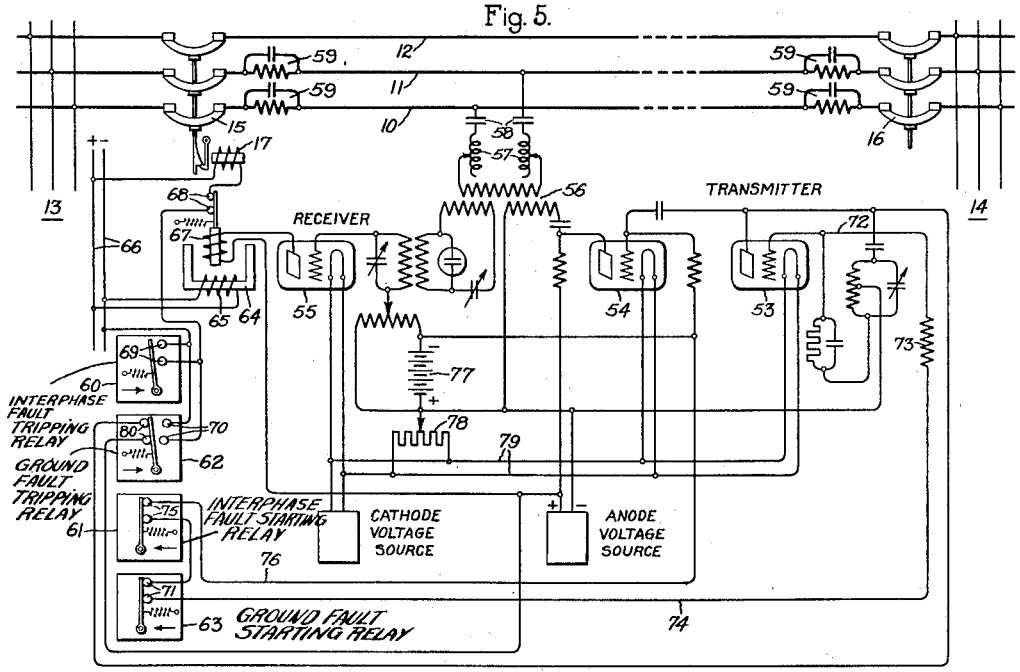

Oct. 10, 1933.  E. H. BANCKER  1,930,333
PROTECTIVE ARRANGEMENT
Filed July 8, 1932  4 Sheets-Sheet 3
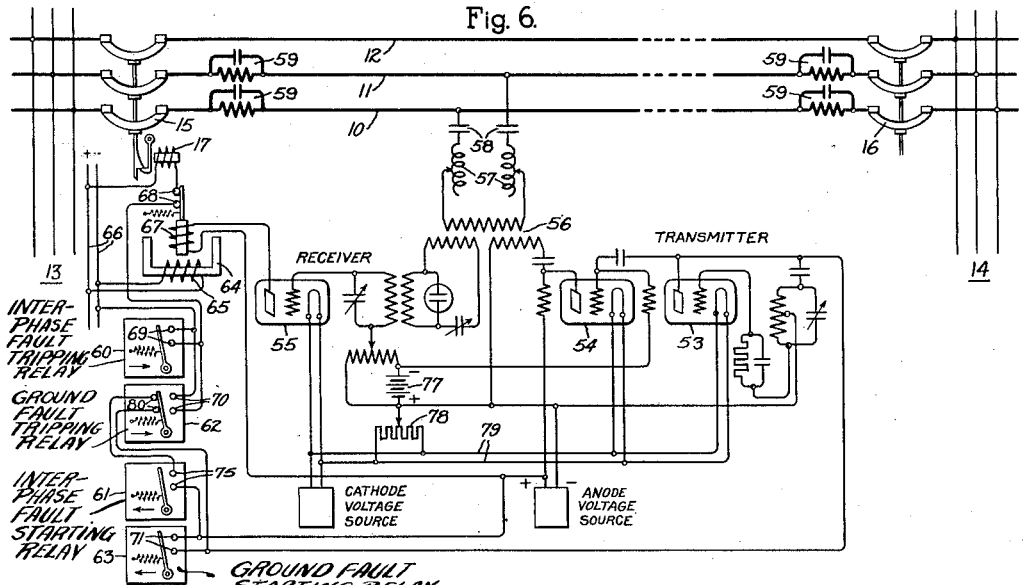
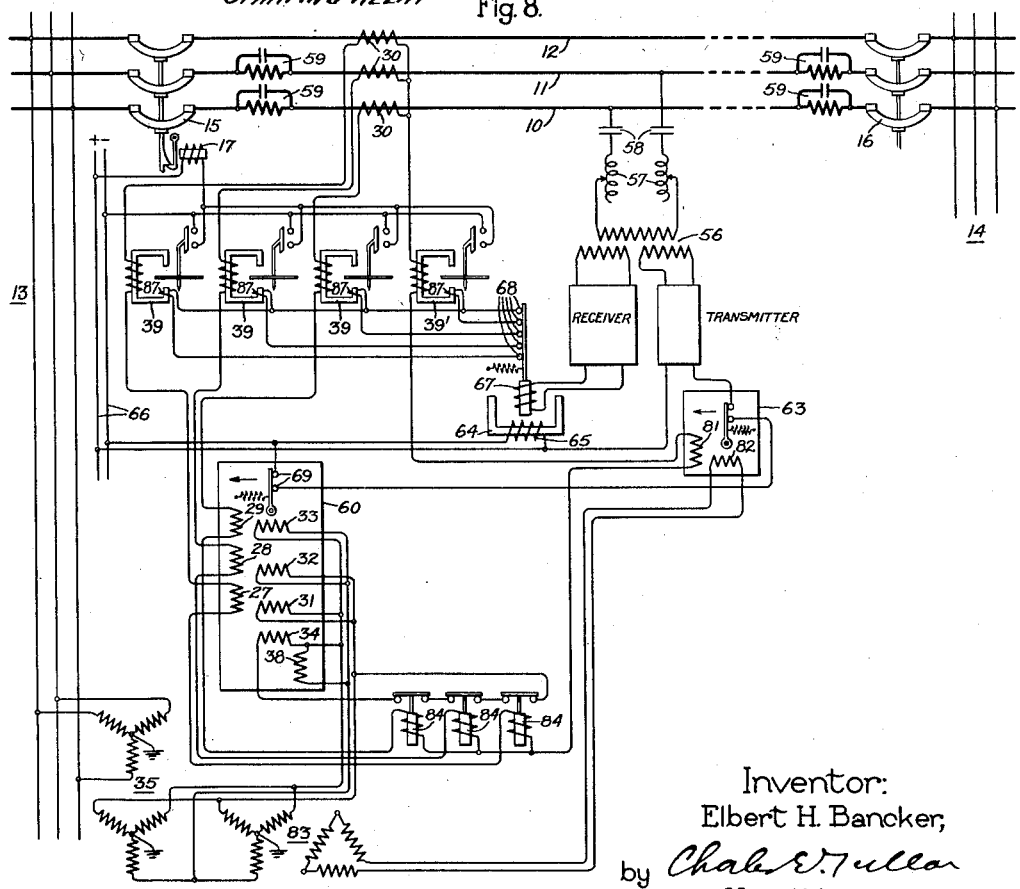
Inventor:
Elbert H. Bancker,
by Charles E. Tullar
His Attorney.

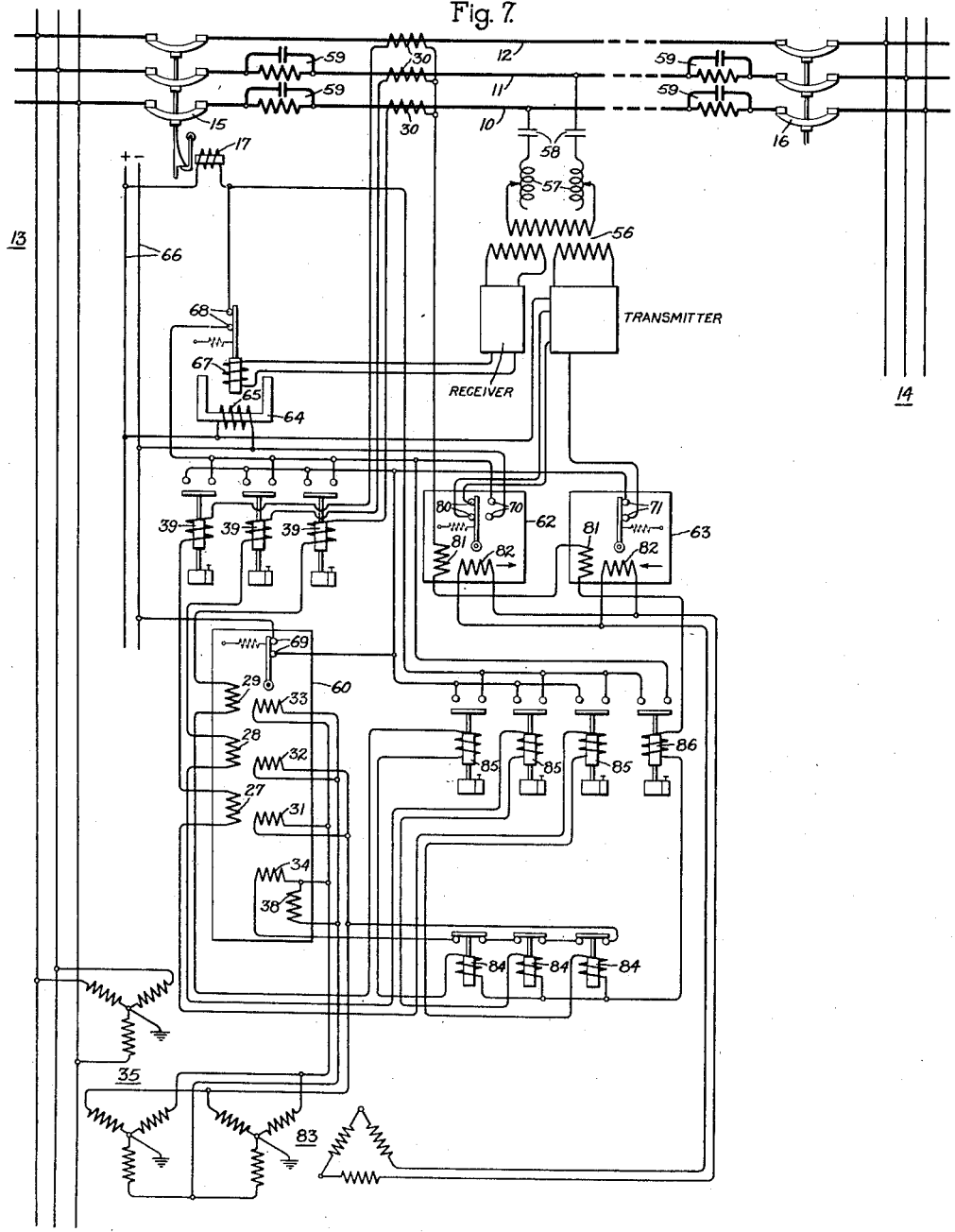

Patented Oct. 10, 1933

1,930,333

UNITED STATES PATENT OFFICE 1,930,333

PROTECTIVE ARRANGEMENT

Elbert H. Bancker, Schenectady, N. Y., assignor to General Electric Company, a corporation of New York Application July 8, 1932. Serial No. 621,404

15 Claims. (Cl. 175—294)

My invention relates to improvements in protective arrangements for electric systems and more particularly to improvements in protective arrangements wherein selective or discriminating action is obtained by the comparison of corresponding electric quantities at two points of a system.

Many arrangements operating on this basis have been proposed. They are subject to one or more limitations such as slow operation, cost, complexity or possibilities of false operation. Thus, where a channel of communication in the form of an auxiliary circuit has to be provided between the ends of a system section to be protected if the auxiliary circuit is actually constructed, the cost being largely dependent on the distance or length of the section is frequently prohibitive. If the circuit is rented its cost may not only be prohibitive but it may also be subject to interference rendering it useless when most needed. Also where the selectivity is dependent on the relative simultaneous positions of a plurality of devices, particularly if inertia is involved as in relay contact operation, the proper positioning relation may be so disturbed either during the fault or immediately after it is switched off as to cause the disconnection of sound sections of the system. This is commonly called relay racing, that is one relay may function too early or too late relatively to another so that the protective effect dependent on the relative positions of their contacts is lost. Moreover, with ground faults occurring while the system is heavily loaded and producing a current flow opposite in direction to the load current, a faulty section may not be disconnected while, on the other hand, a sound section may be disconnected. This trouble is particularly accentuated where greater sensitivity of protection to ground faults than to interphase faults is desired. Furthermore, it is difficult to obtain high speed relay action with dependable relay operation.

An object of my invention is to provide a comparatively simple protective arrangement whereby the expense of the channel of communication may be reduced by using, for example, the system conductors themselves or space transmission or even an auxiliary circuit may be used if cost and other conditions do not prohibit. Another object of my invention is to eliminate relay racing and the false operations attendant thereon and to obtain high speed dependable relay action. A further object of my invention is in general to prevent false operations and particularly those which arise in connection with ground faults occurring under heavy load conditions. Other objects of my invention will appear hereinafter.

My invention will be better understood from the following description when considered in connection with the accompanying drawings and its scope will be pointed out in the appended claims.

Figure 2:
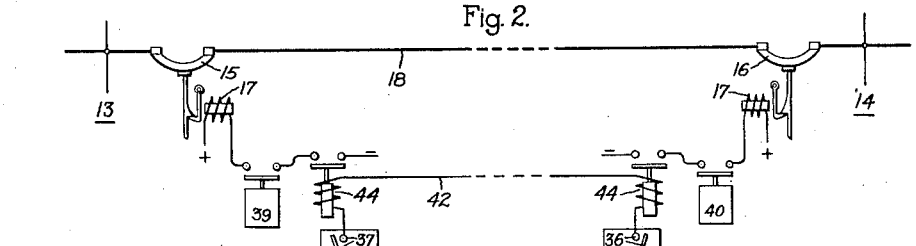
Figure 3:
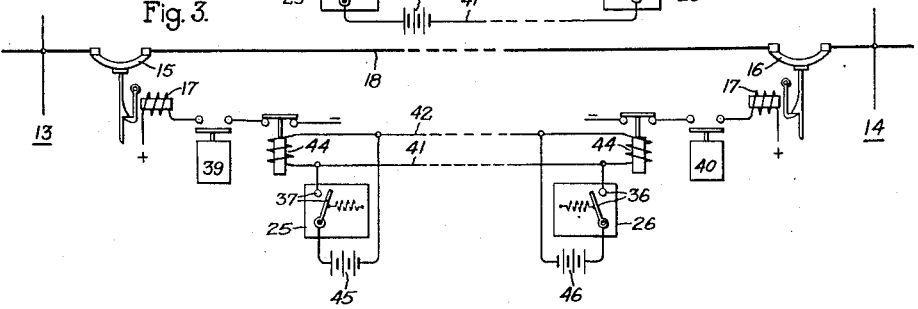

In the accompanying drawings, Fig. 1 illustrates diagrammatically an embodiment of my invention employing an auxiliary circuit as a channel of communication and applied to the protection of a section of an electric system; Figs. 2, 3 and 4 illustrate diagrammatically modifications of the embodiment of my invention shown in Fig. 1; Fig. 5 illustrates diagrammatically another embodiment of my invention employing the system conductors as a channel of communication and superposed alternating current transmission and Figs. 6, 7 and 8 illustrate diagrammatically modifications of the embodiment of my invention shown in Fig. 5.

The several figures of the drawings illustrate different embodiments of my invention as applied to the protection of a section of an electric system which includes circuit conductors 10, 11 and 12 extending between two points, such as stations 13 and 14 and shown partly in broken line to give a conception of distance. At the ends of the section there are provided suitable circuit controlling means, such as circuit interrupters 15 and 16, which are illustrated as latch-closed circuit breakers having trip coils 17. In Figs. 2 and 3, for the sake of simplicity, the system is shown in a single line diagram, the circuit being indicated schematically by the line 18.

For controlling the circuit interrupting means selectively in accordance with the location of a fault within or without the section, I provide, according to my invention, a fault responsive means which selectively controls the chosen channel of communication in accordance with a restraint dependent on a condition of the circuit.

As shown in Fig. 1, the channel of communication comprises a plurality of auxiliary conductors, such as so-called pilot wires 19, 20 and 21 extending between the stations 13 and 14. In circuit with the conductor 20 are the trip coils 17 and two opposed sources of electromotive force, such as batteries 23, 24. For controlling the channel of communication, I provide at the stations 13 and 14 fault responsive directional relay means 25 and 26 respectively which are subject to a restraint dependent on a condition of the circuit 10, 11, 12. The particular relay means shown in Fig. 1 is disclosed in United States Letters Patent 1,883,839, granted October 18, 1932 and, as shown, its restraint is dependent on the product of two voltages of the circuit and a function of the phase angle between them. Only the windings and connections of the relay 25 are shown since the relay 26 is similarly connected at station 14.

As shown, the relay 25 is of the polyphase type and has three windings 27, 28, 29 respectively connected to be energized in accordance with the currents in the phase conductors 10, 11 and 12 through suitable means, such as current transformers 30, and three cooperating voltage windings 31, 32, 33 respectively connected to be energized in accordance with the line to line voltages of the circuit section as derived from a potential transformer 35. These cooperating windings provide a torque whose direction is dependent on whether power flows from the station 13 into the section 10, 11, 12 or vice versa. When the power flow is from the station bus into the section, the relay 25 tends to close its contacts 37. Similarly, the relay 26 tends to close its contacts 36 when power flow is from the station 14 to the section. The restraining windings 34, 38 of the relay 25 are connected to be energized in accordance with two line to line voltages as derived from the potential transformer 35 and exert a torque which tends to maintain the contacts 37 open and similarly for relay 26. If desired, further fault responsive means, such as overcurrent relays 39, 40, may be provided at the stations 13 and 14 respectively, the contacts of the group at each station being connected in parallel with each other and in series with the pilot conductor 21.

Assuming that system conditions are normal, then the relay contacts will be positioned as shown in the drawings. If an external fault should occur on the system, for example, to the right of station 14, the relay 25 would tend to close its contacts 37 since the voltage restraint due to windings 34 and 38 would be reduced in consequence of the fault and the direction of flow of power would be from the station 13 to the section. The relay 26, however, would not tend to close its contacts 36 even though its voltage restraint were reduced because the direction of the flow of power is from the section to the station 14. Consequently, even though some one or more of the relays 39 and 40 should operate, the trip coil 17 will not be energized and the section 10, 11, 12 will remain connected. If on the other hand a fault, such as a short-circuit between conductors 10 and 11 should occur within the section, then the direction of flow of power is from the station at each end into the section and the relays 25 and 26 will close their contacts 37 and 36 because of the reduction in voltage restraint. One or more of the relays 39, 40 at each station will also operate. In this way the circuits of the trip coils 17 are completed through their respective sources 23 and 24 to effect the opening of the circuit breakers 15 and 16.

If the overcurrent relays 39 and 40 are omitted and it is desired to insure the opening of the circuit breaker at each end of the section in case of an internal fault with power feed at only one end, then the movable contacts of the relays 25 and 26 may be biased to the circuit closing position by suitable means such as springs, as shown. With this arrangement it will be observed that in case of total interruption of power to the section both circuit breakers will be tripped. If this is not desired, then the overcurrent relays may be provided but the circuit breaker at the end of the section without feed will not be opened.

It will be observed that since the relays 25 and 26 are connected to be restrained in dependence on the condition of the circuit and tend to have their contacts normally open, there will be no racing of the contacts on the occurrence of faults or surges following the disconnection of faults so that regardless of how fast the relays may be there is no tendency for false operation of the circuit breakers either on internal or external faults.

In the modifications of my invention shown in Figs. 2 and 3 it will be observed that only two auxiliary conductors 41 and 42 are required instead of three, as in Fig. 1. In Figs. 2 and 3 the connections of the relays 25, 26, 39 and 40 to the system 18 have been omitted for simplicity since they will be obvious from Fig. 1. In Fig. 2 relays 25 and 26 control the energization of auxiliary relays 44 in the circuits of the trip coils 17 from a battery 43 so that the auxiliary relays 44 are energized only when both of the relays 25 and 26 close their contacts. In Fig. 3 relays 25 and 26 control the energization of the relays 44 through batteries 45 and 46 connected in such a way that when either of these relays closes its contacts, both of the relays 44 are energized to open the circuits of the trip coils 17.

Referring now particularly to Fig. 2, the relays 25, 26, 39 and 40 may be considered to operate in the same manner as in the embodiment of my invention shown in Fig. 1. Thus, in case of external faults, one or the other of relays 25, 26 will not close its contacts and even though both of the overcurrent relays 39 and 40 operate, the circuit breakers 15 and 16 will not be tripped. If the relays 25 and 26 do not have voltage restraint as in Fig. 1, then the contacts of one or the other will always be open on through power flow so that no tripping will occur on through faults regardless of the restraint feature. On in-feed to the section 18 from one or both ends, both relays 25 and 26 will close their contacts due to the spring bias and the direction of the supplied power whereby to insure tripping of the circuit breakers 15 and 16 on operation of the overcurrent relays 39 and 40.

Referring now to Fig. 3, it will be assumed first that the voltage restraint tends to close the contacts of the relays 25 and 26 against the bias of the spring and with either the assistance or opposition of the directional torque depending upon the flow of power at the relay location. Then under normal conditions the contacts of both relays 25 and 26 will be closed and both of the auxiliary relays 44 energized to maintain the circuits of the trip coils 17 open. In case of through faults, the voltage restraint will become small and even though the power torque at one point in conjunction with the spring bias may be sufficient to overcome the restraint torque, the power torque and the voltage restraint torque at the other point will oppose the spring and maintain the contacts of the relay at this point closed. Consequently, both of the relays 44 will be energized from one of the sources 45 and 46 controlled by the respective relays 25 or 26. In case of an internal fault, the voltage restrains will be small and opposed by the power torques and the spring torques. Consequently, the contacts of relays 25 and 26 will open and both of the relays 44 are deenergized so that when the overcurrent relays 39 and 40 operate, both of the circuit breakers 15 and 16 will be tripped. Since tripping will be effected as soon as the relays 44 are deenergized, it will be apparent that the overcurrent relays 39 and 40 may have a substantially instantaneous circuit closing action without interfering with the proper relaying operation.

It will be observed that, with an internal fault fed from only one end, the relay at the end which is not supplied will open its contacts under the spring bias because there is no voltage restraint to oppose this bias and the circuit breaker at this end will not be tripped but the circuit breaker at the supplied end will be tripped. In case the overcurrent relays 39 and 40 are omitted, it will be observed that both breakers will be tripped whether the fault is supplied from one or both ends. It will also be obvious to those skilled in the art that, if desired, further contacts may be added to the auxiliary relays to supervise the pilot circuit 41 and 42 so that in case of a break-down in this circuit causing the deenergization of one or the other of the relays 44, the deenergized relay could give an alarm or indication of whatever nature desired.

Assuming now no voltage restraint, then at no load the contacts of both relays 25 and 26 are open under the spring bias and there will be no tripping if the overcurrent relays 39 and 40 are present. Assuming the line 18 energized and through power flow then one or the other of the relays 25 and 26 will have its contacts closed by the directional torque. Consequently, both of the auxiliary relays 44 will be energized and no tripping can occur. On internal faults with power feed-in from one or both ends, the spring torques alone or in conjunction with the directional torques where such exist cause the relays 25 and 26 to open their contacts, thereby deenergizing the auxiliary relays 44. Consequently, one or both of the circuit breakers 15 and 16 will be tripped. In order to prevent false tripping in case of a through fault occurring while the line 18 is not loaded, the overcurrent relays 39 and 40 should have sufficient time delay to prevent the closing of their contacts before the contacts of the relays 44 are opened. Also after a through fault, the overcurrent relays 39 and 40 should open their contacts before the auxiliary relays 44 reclose.

It will now be assumed that the voltage restraint torque works with the spring bias to open the contacts and that these two effects are opposed or assisted by the directional torque depending upon the direction of the flow of power. Under normal conditions the restraining and biasing effects will predominate over the directional torque even though it is opposed and both of the relays 44 will be deenergized with their contacts closed. In case of a fault external to the section 18 the restraint torque is materially diminished and either the relay 25 or 26 closes its contacts in consequence of the predominance of the directional torque. Consequently, both of the auxiliary relays 44 are energized and no tripping can occur. In order to prevent any possibility of false operation, the overcurrent relays 39 and 40 should have sufficient time delay to permit the relays 44 to open their contacts before the overcurrent relays close their contacts. Also the relays 44 should not reclose their contacts before the overcurrent relays 39 and 40 open their contacts. In case of an internal fault, the voltage restraint is greatly diminished but the directional torques are such that neither of the relays 25 or 26 closes its contacts. Consequently, as soon as the overcurrent relays 39 and 40 operate, both of the circuit breakers are tripped. It will be obvious that both ends of the section will be disconnected in case of in-feed at each end or in case of in-feed at only one end, this end will be opened.

The modification of my invention shown in Fig. 4 is analogous to that shown in Fig. 3 except that in place of the polyphase relays 25 and 26 I may use a plurality of single-phase relays 47, 48 for controlling the auxiliary relays 44. Also the overcurrent relays have been omitted although they may be used in the same manner as set forth in connection with Fig. 3.

As illustrated, each of the relays 47 and 48 is of a directional type involving a restraining torque whose direction is fixed and a directional torque which, as shown, is a power torque. The current winding 49 cooperates with the voltage winding 50 to provide the power torque and the restraint may be a voltage torque produced by the voltage winding 51. Inasmuch as examples of such relays are known to the art, further discussion of their details is unnecessary. As shown in Fig. 4, the contacts 52 of the relays 47 and 48 at each station are arranged in series in a circuit including the respective sources 45 and 46 across the pilot circuit 41, 42. The contacts 52 may be biased to the open position by spring means, as shown. The voltage restraint tends to close the contacts 52 and power flow from the station to the section tends to open these contacts.

Normally the contacts 52 will be held closed, as shown, by the voltage restraint to maintain the relays 44 energized and the circuits of the trip coils 17 open. In case of faults external to the section, the voltage restraint will be reduced and the directional torque at one station or the other will assist the springs to open the contacts 52 of the relays at this station. Nevertheless, the contacts 52 of the relays at the other station will remain closed thereby keeping the auxiliary relays 44 energized and preventing the tripping of the circuit breakers 15 and 16. In case of internal faults whether fed from one or both ends, the contacts 52 will be opened either by the spring bias, the directional torque or a combination of both and both of the auxiliary relays 44 will be deenergized and cause the opening of the circuit breakers 15 and 16. If overcurrent relays are not used, it will be obvious that if the line power fails, both circuit breakers will be opened. It will also be apparent that by reason of the fact that a relay is provided for each phase it is immaterial what conductor or conductors are involved in a fault since some one of the relays 47, 48 at each station will operate in case of an internal fault to insure tripping.

In the embodiment of my invention shown in Fig. 5 instead of employing pilot conductors, I include the circuit conductors 10 and 11 themselves in the channel of communication. Also for the energization of the channel of communication instead of using direct current, as shown in Figs. 1-4, I employ alternating current of a frequency differing from the frequency of the system power current. This superposed control current may be provided by any suitable means which is illustrated, for example, as an electric discharge valve transmitter examples of which are well known to the art. The transmitter shown embodies a master oscillator valve 53 of the grid leak type and an amplifier valve 54. For making use of the transmitted energy, I employ a suitable receiving means which is tuned to the oscillation frequency of the transmitter and which, as illustrated, is an electric discharge valve receiver embodying a receiving valve 55 and suitable amplifying valves, if necessary, although for the sake of simplicity these are omitted. The cathodes or filaments of the transmitter and receiver discharge valves are preferably operated at normal voltage at all times so as to increase the speed of operation of the protective apparatus. The transmitter and receiver are coupled to each other and to the line conductors 10 and 11 by suitable means, such as a coupling transformer 56, inductances 57 and capacitances 58, the devices 57 and 58 being tuned for the desired transmission frequency. In order to avoid false operations which might result if the transmitter oscillation in one section escaped to another section and also to reduce transmission losses, each section may be provided with suitable trap circuits 59 for confining the high frequency transmitted energy to the section in question. By using adequate power in the transmitter and a relatively insensitive receiver, I obtain freedom from interference which might otherwise be caused by static and arcing grounds.

For selectively controlling the channel of communication in accordance with the location of a fault within or without the section, I provide according to my invention interphase fault directional relay means and ground fault directional relay means which jointly control the operation of the transmitter and thereby the energization of the channel of communication. As illustrated, the interphase fault responsive means includes tripping and starting relays 60 and 61 respectively which may be the same and connected in the same manner as the relay 25 in Fig. 1. The circuit connections and windings of the relays 60 and 61 are accordingly omitted for clearness. The ground fault responsive means includes tripping and starting ground current directional relays 62 and 63 respectively whose windings and circuit connections are also omitted for clearness since the ways of connecting them are well known to the art and since one way is illustrated in Fig. 7, for example. For convenience in understanding the operation of the relays 60, 61, 62 and 63 there are arrows applied thereon to indicate the direction of power to move the contacts from the positions shown. The starting relays are preferably instantaneous circuit opening relays in order to increase the speed of operation of the protective apparatus.

I also provide a control or receiver relay means 64 which is connected to be energized from the receiver. This relay 64 may be of any suitable type and, as illustrated, is a sensitive polarized directional relay which preferably opens its contacts quickly and closes them somewhat slowly in order to prevent the relay from resetting before the contacts of the tripping relays open after an external fault has been cleared. The receiver relay has a polarizing winding 65, which may be connected to the station control source 66 and an operating winding 67 which is connected in the anode circuit of the valve 55. While I have shown only the apparatus at station 13 it is to be understood that similar apparatus is provided at the other station.

Under normal conditions, the interphase fault tripping relay 60 will have its contacts 69, which are in the circuit of the trip coil 17, open by reason of the spring bias and the voltage restraint, although opposed by the power directional torque when power is fed from the station 13 to the section. Also the ground fault tripping relay 62 will have its contacts 70 which are in the circuit of the trip coils 17 held open by reason of the spring bias. Thus, if either of the relays 60 or 62 operates to close its respective contacts 69 or 70 and the receiver relay 64 does not have its operating winding 67 energized, the circuit breaker 15 will be tripped.

In order to prevent false tripping with power flow from station 13 to the section on through heavy loads which would weaken the restraint of the interphase fault directional tripping relay 60 and with a ground fault in another section causing ground current flow in the direction opposite to the load current, I, in effect, interlock the interphase fault tripping relay 60 with the ground current directional starting relay 63. One way in which this may be done is to have the contacts 71 of this relay in the closed position block the transmitter by applying a negative bias to the control electrode or grid of the master oscillator valve 53, as shown. The circuit is from the grid of valve 53, conductor 72, current limiting means 73, conductor 74, contacts 71 of relay 63, contacts 75 of relay 61 and conductor 76, voltage source 77 intermediate tapped resistance 78, filament conductors 79 and filament of valve 53.

With this arrangement, if there is a heavy through load tending to cause power flow in the direction such that the interphase fault relay 60 would tend to close its contacts 69, that is power flow from station 13 to the section, and a ground fault should occur to the left of station 13 with ground current flow from station 14 to the section, then the ground current starting relay 63 would open its contacts and thus start the transmitter at station 13. The receiver relay 64 at this station would consequently be energized and thereby cause the receiver relay to open its contacts 68 and thus prevent the tripping of the circuit breaker 15. At station 14, the receiver relay would be energized from the transmitter of station 13, thus preventing the ground fault tripping relay at this station from opening the circuit breaker 16. The direction of flow of power is such that the interphase fault tripping relay at station 14 would tend to keep its contacts open.

In order to insure tripping on an internal ground fault with a heavy through load in the opposite direction to the ground fault current, I, in effect, interlock the interphase fault starting relay 61 with the ground current tripping relay 62. For this purpose the contacts 80 of the ground current tripping relay 62 are arranged to control the anode circuit of the master oscillator valve 53 so that even with a heavy through load in the direction indicated by the arrow on the interphase fault starting relay 61 which would open its contacts 75 and thus remove the negative bias from the valve 53, the ground current tripping relay 62 with ground current in the direction indicated by the arrow thereon would open the anode circuit of the valve 53 and prevent transmission. Consequently, the receiver relay 64 would not be energized by the transmitter at station 13 to open its contacts and tripping of the circuit breaker 15 would result as soon as the ground tripping relay 62 closed its contacts 70. At the other end of the section, that is station 14, the load and ground currents would be in a direction to keep the negative bias on the master oscillator tube so that no transmission would occur from this station. The ground current tripping relay would moreover open the anode circuit of the transmitter at this station and close its trip contacts so that both of the circuit breakers 15 and 16 would be tripped.

Assuming an interphase through fault, then the interphase starting relay at either station 13 or 14 will operate and start the transmitter at the corresponding station since the ground fault tripping relays keep their contacts 80 closed. Consequently, each receiver is energized and causes its associated receiver relay 64 to open its contacts 68 and thereby prevent tripping even though the associated interphase fault relay may tend to close its contacts 69. It will be obvious that the tripping relays 60 and 62 must have sufficient time delay to cover the starting of the transmitter and the operation of the receiver relay in order to avoid false tripping.

In case of an internal interphase or ground fault either the tripping relay 60 or 62 will close its contacts and complete the circuit of the trip coil 17 because the transmitters will be blocked by the starting relays 61 and 63 so that the receiver relay cannot be energized to open its contacts 68.

The embodiment of my invention shown in Fig. 6 is very similar to the arrangement shown in Fig. 5 except for the interlocking effects between the interphase and ground fault relays. As in Fig. 5, the arrows on the directional relays 60, 61, 62 and 63 indicate the direction of power flow to effect movement of their contacts from the position shown. In this arrangement it will be noted that the starting relays 61 and 63 have their contacts open for power flow into the section from the station 13 thereby opening the anode circuit of the master oscillator tube 53 and preventing the operation of the transmitter. Also the contacts 80 of the ground tripping relay 62 are in series with the contacts 75 of the phase starting relay 61 so that in case of ground faults occurring during heavy load conditions the interphase fault starting relay alone cannot cause a false operation of the transmitter.

It will be apparent from the description in connection with Fig. 5 without going into further detail that with external faults the transmitter at one or the other of the stations 13 and 14 will be started to energize the receivers at each station. Consequently, the receiver relay 64 at each station will be energized to open its contacts and prevent tripping. On the other hand with internal faults the transmitter at each end will be blocked and the tripping relays 60, 62 will effect the opening of the circuit breakers 15 and 16.

In the embodiment of my invention shown in Fig. 7 I have illustrated one arrangement of the connections of the cooperating windings of the ground fault tripping and starting relays 62 and 63. Thus their current windings 81 are connected to be energized in accordance with the vector sum of the currents in the phase conductors 10, 11 and 12 and their voltage windings 82 are connected to be energized in accordance with the resultant voltage to ground of the bus at the station by suitable means, such as a star-delta potential transformer 83.

In this embodiment of my invention, as in Fig. 5, the ground fault tripping relay 62 through its contacts 80 controls the energization of the plate circuit of the master oscillator tube of the transmitter. However, instead of having a separate interphase fault starting relay to control the transmitter, I arrange the contacts 69 of the interphase fault relay 60 in series with the contacts 71 of the ground fault starting relay 63 in the grid biasing circuit of the transmitter. In addition for interphase faults I may also use, as in Fig. 1, short time overcurrent relays 39 which have their contacts in series with the receiver relay contacts 68 and with the interphase fault tripping relay contacts 69 to control the trip coil circuit.

While I have shown the restraint of the tripping relay 60 as derived from the bus at station 13 through the potential transformer 35, it is under the control of an electric quantity of the circuit through suitable means, such as instantaneous low set overcurrent relays 84. It is, of course, immaterial whether the restraint is produced electrically directly from the system to be controlled or otherwise or is produced mechanically so long as it is subject to an electric circuit condition, such as undervoltage, overcurrent, etc., which is a criterion of fault conditions. It will be obvious that as soon as the restraint is removed from the relay 60, it operates as a high speed directional relay.

As in previously described modifications of my invention, in case of through faults, transmission is effected from at least one station on the section to energize the receivers and thereby the receiver relays which open their contacts in the trip coil circuits to prevent tripping. Thus, assuming an interphase fault on the system to the left of the section 10, 11 and 12, power flow would be from the section to station 13. The interphase fault directional relay 60 would open its contacts 69 thereby removing the grid bias from the transmitter at station 13. This will energize the receivers at each end of the section and prevent tripping. If the through fault is a ground fault, then the ground current directional tripping relay 62 at the station 13 will keep its contacts 80 closed but the ground fault starting relay 63 at station 13 will open its contacts. Consequently, the transmitter at station 13 will have anode voltage excitation with no grid bias and will, therefore, transmit. Thus the receiver relays at each station will be energized to prevent tripping. In case of internal faults, the transmitter at neither station will be energized but the interphase and/or ground fault tripping means will be. This, in conjunction with the operation of the overcurrent relays 39 in case of interphase faults, will effect the tripping of the circuit breaker. The interphase fault directional relay 60 will, of course, have its restraint removed immediately upon the operation of any one of the overcurrent relays 84 so that the restraint will not tend to hold the contacts closed when they should open in case of through faults. It will be observed that in this modification of my invention the relay 60 really combines the tripping and starting functions of the relays 60 and 61 of Figs. 5 and 6.

In order to provide so-called back-up protection, that is to insure the tripping of the circuit breakers in case of failure of the protective apparatus in the section or some other section at fault, I may provide interphase and ground fault overcurrent relays 85 and 86 respectively, whose contacts are in the trip coil circuit in series with the contacts 69 of the interphase fault relay 60 and the contacts 70 of the ground fault relay 62 respectively. The overcurrent relays 85 and 86 will be relatively long time relays in comparison with the relay 39.

The modification of my invention shown in Fig. 8 is like that shown in Fig. 7 except that I have omitted the back-up protection and the ground current tripping relay and that the receiver relay 64 instead of being arranged to open the trip coil circuit operates to prevent the overcurrent tripping relays 39, 39', the latter being a ground fault current relay, from closing their contacts in the trip coil circuit under certain condtions. For this purpose I have schematically illustrated the overcurrent relays 39, 39' as shaded pole time element relays, the circuits of whose shading coils 87 are so controlled by the receiver relay 64 that when its operating winding 67 is deenergized, the circuits of the shading coils are completed by its contacts 68.

Whenever there is no transmission at either station as normally and in case of internal faults, the receiver relay contacts 68 are closed and the overcurrent relays 39, 39' free to operate in their usual manner to control the trip coil circuit. In case of external faults, transmission will be started at one station or the other by the relay 60 for interphase faults or the relay 63 for ground faults since these relays have their contacts normally closed to apply negative bias to the master oscillator valve. In case of transmission, the receiver relays 64 are energized to open the shading coil circuits of the overcurrent relays 39, 39' whereby these are rendered inoperative and there is no tripping. Obviously, the overcurrent relays 39, 39' should have a time action sufficiently great to permit the operation of the receiver relays.

While I have shown and described my invention in considerable detail, I do not desire to be limited to the exact arrangements shown but seek to cover by the appended claims all those modifications that fall within the true spirit and scope of my invention.

What I claim as new and desire to secure by Letters Patent of the United States is:

1. In combination with an electric circuit and circuit interrupting means therefor, means for controlling said circuit interrupting means including a channel of communication, interphase fault directional relay means and ground fault directional relay means connected to be energized from the circuit and means controlled jointly by said relay means for selectively controlling the energization of said channel of communication in accordance with the location of a fault within or without the section of the circuit between said points.

2. In combination with an electric circuit, an oscillation transmitting means, means for controlling said transmitting means including interphase fault directional relay means and ground fault directional relay means connected to be energized from the circuit and means controlled jointly by said relay means for selectively controlling the operation of said transmitting means in accordance with the location of a fault within or without a given section of the circuit.

3. In combination with an electric circuit and circuit interrupting means therefor, means for controlling said circuit interrupting means including a channel of communication between two points of the circuit, means for controlling said channel of communication including interphase fault directional relay means and ground fault directional relay means connected to be energized from the circuit and means controlled jointly by said relay means for preventing the false operation of said circuit interrupting means on the occurrence of a ground fault on the circuit outside of the section between said two points while the circuit is heavily loaded.

4. In combination with an electric circuit, a transmitter at one point of the circuit, a receiver at another point tuned to the frequency of said transmitter, means for controlling said transmitter including interphase fault directional relay means and ground fault directional relay means connected to be energized from the circuit and means controlled jointly by said relay means for selectively controlling the operation of said transmitter whereby to control the energization of said receiver in accordance with the location of a fault within or without the section of the circuit between said points.

5. In combination with an electric circuit and circuit interrupting means therefor, means for controlling said circuit interrupting means including a channel of communication, interphase fault directional relay means and ground fault directional relay means connected to be energized from the circuit and means controlled jointly by said relay means for controlling the energization of said channel of communication.

6. In combination with an electric circuit and circuit interrupting means therefor, means for controlling said circuit interrupting means on the occurrence of a fault on said circuit including a transmitter, a receiver tuned to the frequency of said transmitter, relay means connected to be energized from said receiver, interphase and ground fault directional relay means connected to be energized from said circuit operative in conjunction with said receiver relay means to control the opening of said circuit interrupting means, said ground fault directional relay means being arranged to control the operation of said transmitter.

7. In combination with an electric circuit and circuit interrupting means therefor, means for controlling said circuit interrupting means on the occurrence of a fault on said circuit including a transmitter, a receiver tuned to the frequency of said transmitter, relay means connected to be energized from said receiver, interphase fault directional relay means connected to be energized from said circuit operative in conjunction with said receiver relay means to control the opening of said circuit interrupting means, ground fault directional relay means connected to be energized from said circuit operative in one position to control the operation of said transmitter and in another position to control the opening of said circuit interrupting means in conjunction with said receiver relay means.

8. In combination with an electric circuit and circuit interrupting means therefor, means for controlling said circuit interrupting means on the occurrence of a fault on said circuit including a transmitter, a receiver tuned to the frequency of said transmitter, relay means connected to be energized from said receiver, interphase fault directional relay means connected to be energized from said circuit operative in conjunction with said receiver relay means to control the opening of said circuit interrupting means, ground fault directional relay means connected to be energized from said circuit operative in one position to control the operation of said transmitter and in another position to control the opening of said circuit interrupting means in conjunction with said receiver relay means and directional relay means for preventing the operation of said transmitter under predetermined circuit conditions.

9. In combination with an electric circuit and circuit interrupting means therefor, means for controlling said circuit interrupting means on the occurrence of a fault on said circuit including a transmitter, a receiver tuned to the frequency of said transmitter, relay means connected to be energized from said receiver, interphase fault directional relay means connected to be energized from said circuit operative in conjunction with said receiver relay means to control the opening of said circuit interrupting means, ground fault directional relay means connected to be energized from said circuit operative in one position to control the operation of said transmitter and in another position to control the opening of said circuit interrupting means in conjunction with said receiver relay means, and interphase and ground fault directional relay means connected to be energized from said circuit for preventing the operation of said transmitter under predetermined circuit conditions.

10. In combination with an electric circuit and means for interrupting the circuit at each of two spaced points thereof, means for controlling said interrupting means to stop power flow into the section of the circuit between said points on the occurrence of a fault within the section including a channel of communication between said points and means connected to be energized from said circuit jointly to control the energization of said channel of communication in accordance with a predetermined relation between the power flow and the voltage condition of the circuit at said points.

11. In combination with an electric circuit and circuit interrupting means therefor, means for controlling said circuit interrupting means including a channel of communication between two points of a circuit and means for selectively controlling the energization of said channel of communication in accordance with the location of a fault within or without the section of a circuit between said points including voltage restrained power directional relay means at each of said points connected to be energized from the circuit in accordance with the relation between the direction of power flow and the voltage condition of the circuit at the point.

12. In combination with an electric circuit and means for interrupting the circuit at each of two spaced points thereof, means for controlling said interrupting means to stop power flow into the section of the circuit between said points on the occurrence of a fault within the section including fault responsive means for effecting the opening of said circuit interrupting means, a channel of communication between said points and means connected to be energized from said circuit jointly to control the energization of said channel of communication in accordance with a predetermined relation between the power flow and the voltage condition of the circuit at said points and means controlled by said jointly controlling means for preventing the opening of the circuit interrupting means by said fault responsive means when a different relation exists between the power flow and the voltage condition of the circuit at said points.

13. In combination with an electric circuit, means for interrupting the circuit at each of two spaced points thereof, means for controlling said interrupting means to prevent power flow into the section of the circuit between said points on the occurrence of a fault within the section including fault responsive means for effecting the opening of said interrupting means, a channel of communication between said points and means for controlling the energization of said channel of communication whereby to effect the opening of at least one of said circuit interrupting means on the occurrence of a fault within said circuit portion including power directional relay means at each of said points connected to be energized from said circuit and means for exerting restraints on said relay means respectively dependent on the voltage conditions of the circuit at said points and means controlled by said relay means for preventing the opening of said circuit interrupting means by said fault responsive means when a predetermined relation exists between the power flow and the voltage condition of the circuit at said points.

14. In combination with an electric circuit and means for interrupting the circuit at each of two spaced points thereof, means for controlling said interrupting means to stop power flow into the section of the circuit between said points on the occurrence of a fault within the section including a channel of communication between said points and means for controlling the energization of said channel of communication whereby to effect the opening of at least one of said circuit interrupting means on the occurrence of a fault within said circuit section including power directional relay means at each of said points connected to be energized from said circuit and means for restraining said relay means respectively in accordance with the voltage conditions of the circuit at the points where the relay means are located, and means controlled by said relay means for preventing the opening of the circuit interrupting means when a predetermined relation exists between the power flow and the voltage condition of the circuit at said points.

15. In combination with an electric circuit and means for interrupting the circuit at each of two spaced points thereof, means for controlling said interrupting means to stop power flow into the section of the circuit between said points on the occurrence of a fault within the section including a channel of communication between said points and means for controlling the energization of said channel of communication whereby to effect the opening of at least one of said circuit interrupting mean on the occurrence of a fault within said circuit section including directional relay means at each of said points connected to be energized from said circuit and means for restraining said relay means respectively in accordance with the voltage conditions of the circuit at the points where the relay means are located.

ELBERT H. BANCKER.